(12) United States Patent
Tosun et al.

(10) Patent No.: US 7,916,044 B2
(45) Date of Patent: Mar. 29, 2011

(54) DYNAMIC LOCATION-BASED MAPPING SYSTEM AND METHOD

(75) Inventors: Serkan Tosun, Marlborough, MA (US); Jianxiu Hao, Lexington, MA (US); Yiyi He, Sunbury, MA (US); Matthew Lemay, Cambridge, MA (US)

(73) Assignee: Verizon Data Services LLC, Temple Terrace, FL (US)

( * ) Notice: Subject to any disclaimer, the term of this patent is extended or adjusted under 35 U.S.C. 154(b) by 0 days.

(21) Appl. No.: 12/683,096

(22) Filed: Jan. 6, 2010

(65) Prior Publication Data

US 2010/0171756 A1 Jul. 8, 2010

Related U.S. Application Data

(63) Continuation of application No. 11/096,107, filed on Mar. 31, 2005, now Pat. No. 7,688,227.

(51) Int. Cl.
*G08G 1/123* (2006.01)
(52) U.S. Cl. .................. 340/995.1; 340/539.2; 701/208; 455/456.1; 455/414.3
(58) Field of Classification Search ............... 340/539.2, 340/995.1; 701/208–212; 455/456.1, 414.3
See application file for complete search history.

(56) References Cited

U.S. PATENT DOCUMENTS

| 6,243,596 | B1 * | 6/2001 | Kikinis | 455/572 |
|---|---|---|---|---|
| 6,522,347 | B1 * | 2/2003 | Tsuji et al. | 715/848 |
| 6,865,480 | B2 * | 3/2005 | Wong | 340/990 |
| 6,912,462 | B2 * | 6/2005 | Ogaki | 340/995.14 |
| 6,931,661 | B2 * | 8/2005 | Smith | 725/133 |
| 7,009,599 | B2 * | 3/2006 | Pihlaja | 455/566 |
| 7,089,110 | B2 * | 8/2006 | Pechatnikov et al. | 340/988 |
| 7,142,205 | B2 * | 11/2006 | Chithambaram et al. | 345/418 |
| 2001/0030667 | A1 * | 10/2001 | Kelts | 345/854 |
| 2003/0201914 | A1 * | 10/2003 | Fujiwara et al. | 340/995.24 |
| 2004/0150534 | A1 * | 8/2004 | Linn | 340/995.13 |
| 2005/0091096 | A1 * | 4/2005 | Coates et al. | 705/8 |
| 2005/0251331 | A1 * | 11/2005 | Kreft | 340/995.1 |

* cited by examiner

*Primary Examiner* — Eric M Blount

(57) ABSTRACT

A graphical mapping system configured to display mapping information on a handheld device is disclosed. The system includes an image map database configured to store map data for a plurality of geographic areas, which is useful for generating graphical maps. The system further includes a vector map database configured to store vector map data, which is useful for generating vector "overlays" that correspond to the graphical maps. In response to a mapping request from a handheld device, a set of image mapping data and a corresponding set of vector mapping data, both associated with a given geographic location, are retrievable.

21 Claims, 3 Drawing Sheets

DYNAMIC LOCATION-BASED MAPPING SYSTEM AND METHOD

CROSS REFERENCE TO RELATED APPLICATIONS

This application is a continuation of U.S. patent application Ser. No. 11/096,107, filed on Mar. 31, 2005, which is hereby incorporated by reference in its entirety.

FIELD

This application relates to a dynamic location-based mapping system and method.

BACKGROUND

Electronic location-based mapping systems are useful for allowing users to generate graphical map images for a wide variety of geographical locations. In general, in response to being provided with an address or other unique identifier (e.g., phone number), an electronic location-based mapping system generates a graphical map on a computer screen, for example, which the user can print, if desired. Many such mapping systems are accessible over wide area networks, such as the Internet. One exemplary known mapping service is at www.mapquest.com. Other known location-based mapping systems wirelessly provide graphical maps to automotive navigational systems, such as, for example, On-Star™.

There are also known location-based mapping systems that are configured to provide and display mapping information to handheld devices, such as cellular telephones, handheld computers, personal digital assistants (PDAs) and the like. These handheld devices may communicate with the mapping system wirelessly or through a wired connection to a computer, such as through a docking station or cradle, for example. While it is convenient for users to be able to obtain mapping information through a handheld device, the relatively small display screen on many handheld devices limits the size of the map image that can be displayed, and, as a result, limits their usefulness. For example, because of the limited area on the screen of a handheld device, relatively little mapping detail, such as roads, street names, city/town names, etc., can be shown at any given time without unduly crowding the map image on the screen. Typically, the name of the largest cites and streets are shown to the exclusion of smaller towns and streets.

Another limitation of known location-based mapping systems for handheld devices is that they do not customize the graphical mapping information to the various handheld devices available in the market. A wide variety of different types and models of handheld devices are commercially-available, each potentially having a different type of display screen with different performance specifications, such as different sizes, resolutions, accepted graphic compression formats, available memory and zoom capabilities. Accordingly, a map image may appear overly-congested and unintelligible on one handheld device and may not use the full space or resolution capabilities on another handheld device.

The embodiments described herein were developed in view of the drawbacks and limitations described above.

SUMMARY

A mapping system is provided that provides image map data to a handheld device configured to generate a static map image on the handheld device that is optimized for that particular device. Further, the mapping system provides a set of vector map data corresponding to the image map data that permits the handheld device to dynamically display information in a text box and/or in a graphical icon, for example, related to the various geographic locations on the static map. In this way, additional information about the various geographic locations, such as street names, building names, etc., can be dynamically displayed when, for example, a cursor or other pointer, hovers above the location on the static map. As a result, the amount of information displayed on the static map image can be optimized so that it is not overcrowded, without losing the ability to provide additional information associated with the geographic locations on the map.

BRIEF DESCRIPTION OF THE DRAWINGS

The accompanying drawings illustrate various embodiments. The illustrated embodiments are merely exemplary and are not intended to be limiting. Throughout the drawings, identical reference numbers designate identical or similar elements. In the drawings.

DETAILED DESCRIPTION

Figure 1:
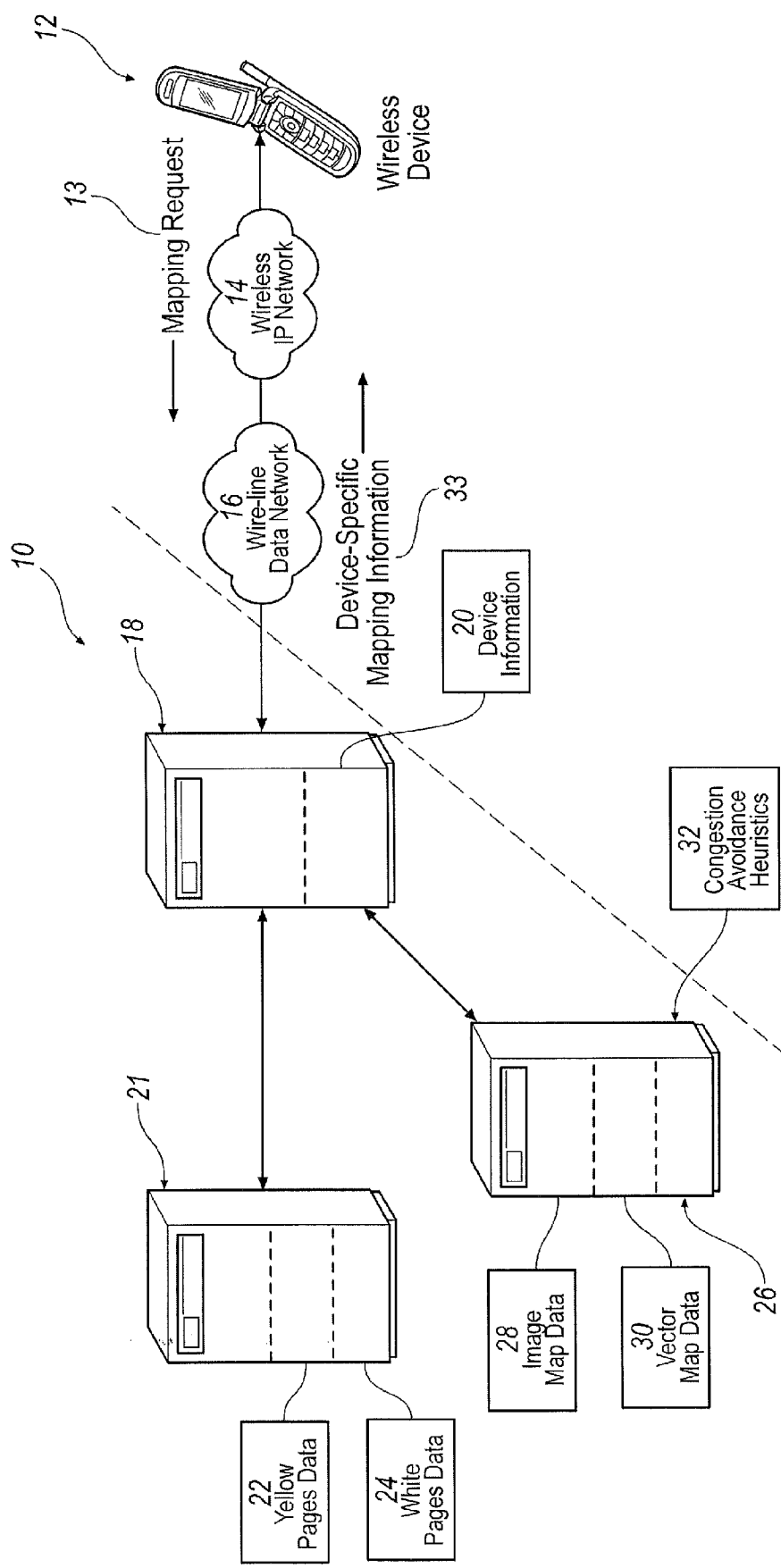
FIG. 1 illustrates an exemplary location-based mapping system and an exemplary handheld device in communication over an Internet Protocol network, according to an embodiment.

FIG. 1 depicts a dynamic location-based mapping system 10 configured to provide dynamic and device-specific mapping information to a handheld device 12. A handheld device 12 is shown in FIG. 1 as a cellular telephone, but, in fact, the handheld device 12 can be any of a wide variety of portable electronic devices that has a display screen, including, for example, a personal digital assistant (PDA), handheld or portable computer, a walkie-talkie or other two-way communication device, for example. In the embodiments described hereinafter, the handheld device 12 is illustrated and described as a wireless communication device (having a wireless receiver and transmitter), but the handheld device 12 may also be of the type that communicates to a mapping system through a docking station or cradle that is physically connected to a computer, for example.

In the embodiment shown in FIG. 1, the mapping system 10 communicates with the handheld device 12 over a combination of a wireless Internet Protocol (IP) network 14 and a wired data network 16. Other configurations and combinations of a wireless and/or wired data network could be used. The system 10 may also cooperate with a land-line communication network such as public switched telephone network (PSTN) in a manner known to those skilled in the art.

The mapping system 10 includes a proxy server 18 in communication with a directory server 21 and a map server 26. The proxy server 18 is a physical computing machine configured as a gateway between the data networks 14 and 16 and the mapping system 10. The directory server 21 generally stores one or more databases having textual information about a plurality of geographic addresses, such as that typically contained in the well-known Yellow Pages 22 and White Pages 24 directories (e.g., name, address, phone number, business hours, reviews, price lists, product/service descriptions, etc.). The map server 26 generally stores one or more databases of image map data 28, vector map data 30, and congestion avoidance heuristics 32. In short, image map data 28 is data used to generate a graphical map image of a given geographic area. Map vector data 30 is additional information associated with various locations on a given map image, such as street names, city names, addresses, etc. The congestion avoidance heuristics 32 relates to information used by the system to ensure that a requested map of a particular geographic includes the appropriate amount of detail (i.e., not too congested and not too "bare"). While the directory server 21 and the map server 26 are shown in FIG. 1 as separate physical computing devices, it is possible that the directory server 21 and/or the map server 26 could be integrated with the proxy server 18 or, alternatively, the information provided by the directory server 21 and/or the map server 26 could be accessed by the proxy server 18 from an external source over a network communication connection. In general, the proxy server 18 receives requests 13 from various handheld devices 12, and, based thereupon, communicates with the directory server 21 and/or the map server 26 to fulfill the request 13.

A request for mapping information 13 from a handheld device 12 can have a variety of formats. In some embodiments, the mapping request 13 will include such data as: (i) location to be mapped; (ii) map height and width in pixels; (iii) user's desired zoom level; (iv) type of device making request; and (v) accepted data compression type. Other request formats are possible as well. Upon receiving a mapping request from the handheld device 12, the proxy server 18 identifies the type, brand and/or model of the handheld device. As indicated, the type of device may be included as part of the initial mapping request, in which case the proxy server 18 need only extract that information from the mapping request data packet. Alternatively, the proxy server 18 may derive the device identification from the nature or format of the mapping request data packet. Other methods of deriving the identity of the requesting handheld device 12 are possible and known to persons skilled in the art. The primary purpose of identifying the requesting handheld device 12 is to determine the appropriate format in which to provide the mapping data and the map image(s) requested. Accordingly, once the proxy server 18 identifies the requesting handheld device, the proxy server 18 obtains information about the display capabilities of the requesting handheld device 12. In one embodiment, the proxy server 18 uses a database (which is stored on or otherwise accessible to the proxy server) correlating various types, brands, and models of handheld devices to the specifications of their associated display screens, such as the screen size, display resolution, accepted compression formats, available memory and zoom capabilities, for example. This information will be used, as described in more detail hereinafter, to determine the appropriate format for the map image to be downloaded to the handheld device 12.

Figure 2:
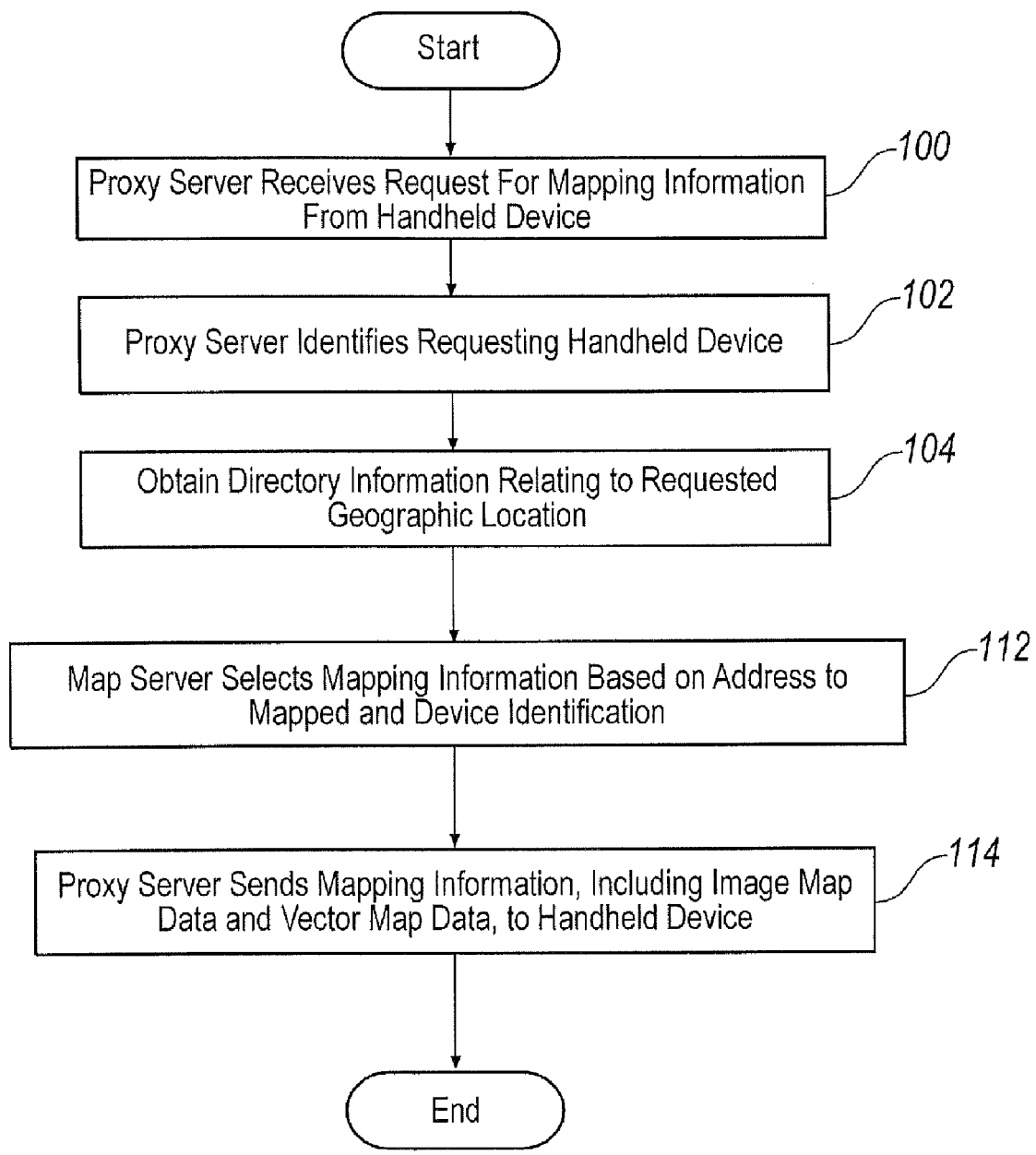
FIG. 2 is a flow diagram setting forth an exemplary method of deriving and delivering a set of image map data and corresponding vector map data relating to a requested map location, according to an embodiment.

FIG. 2 sets forth a flow diagram of an exemplary method of providing a map image and related information to a handheld device, according to one embodiment. References to the mapping system and the handheld device refer to the exemplary components shown in FIG. 1. The process begins when the proxy server 18 receives a request for mapping information 13 from a handheld device 12, as shown at step 100. The request may be made in a variety of ways. For example, the user may know the address of the location to be mapped. Alternatively, the user may know the name of the resident/business and/or the associated telephone number of the location to be mapped. The user may cause the handheld device to request mapping information based upon any one of these pieces of data. Persons skilled in the art will recognize other pieces of data that a handheld device user may be able to use to request mapping information for a particular geographic location.

Once the request for mapping information is received, the proxy server 18 identifies the requesting device (step 102), using any of a variety of methods as described above, with the primary purpose being to ascertain the display capabilities of the requesting handheld device. Thereafter, at step 104, in response to a request from the proxy server 18, the directory server 21 uses the address, telephone number, name, etc., as the case may be, to search the Yellow Pages and White Pages databases to ascertain a full record of information for the request, including the address, name, telephone number, as well as information like hours of operation, etc. This information is ultimately downloaded to the handheld device 12 along with an appropriate map image and associated mapping information, as described below.

Thereafter, the proxy server 18 communicates with the map server 26 to obtain image map data 28 (ultimately used to generate a map image) and map vector data 30 (used to generate a vector map that "overlays" the map image) for the geographic location requested by the user. The map server 26 identifies and selects appropriate image map data 28 and vector map data 30 from its databases, as shown at step 112. The image map data 28 is used to generate a static map image, showing the roads and major landmarks, for example. The map server 26 retrieves image map data 28 to generate the static map based upon the geographic location in question and the identification of the particular handheld device 12 making the mapping request. That is, for the same geographic location, the image map data provided by the map server 26—and thus the appearance of the map image generated therefrom on the handheld device 12—may look somewhat different, depending upon the type of display used on the handheld device 12 making the mapping request. More particularly, the map server 26 can produce a set of image map data corresponding to a map image that is an appropriate size, with appropriate colors, in an appropriate resolution, and with appropriate detail for the display screen of the requesting handheld device 12.

Moreover, map server 26 also applies congestion avoidance heuristics 32 that ensure that the amount of information (e.g., streets, names, etc.) displayed on the static map image ultimately displayed on the handheld device 12 (generated from the image map data 28) is appropriate to ensure readability, that is, not much or too little information for the requested zoom level. For example, for a given zoom level, the content of the image map data 28 is adjusted in such a way that if there is too much information, e.g., too many street names, only the major highways will be illustrated on the handheld device 12. Alternatively, if there is too little information, i.e. a rural area, all data available is shown no matter what the zoom level is such that the image map data 28 will always provide some sort of identifying information to the user. In this fashion, map image ultimately generated on the handheld device 12 will be more presentable and easy to understand. In these ways, the map image ultimately generated on the handheld device 12 will be customized and optimized for the particular type and specifications of the handheld device.

The vector map data 30 is used to generate a vector "overlay" on the static map image, having various additional data associated with different locations on the static map. For example, street names, landmark names, building names, etc. that are associated with different locations on the static map image may be part of the vector "overlay." When the static map image is displayed on the handheld device, the data in the vector "overlay" (e.g., street names, building names, landmark names, etc.) is invisible to the user of the handheld device until the user moves the cursor over the associated location on the display screen, as discussed in more detail below. The vector map "overlay" is generated as a binary data file associated with the static map. The vector map "overlay" may be in the form of a look-up table or matrix of two-dimensional map coordinates—for example, $(X_1, Y_1)$, $(X_1, Y_2)$, etc.—that are associated with corresponding dynamic display information (e.g., street names, building names, landmark names, etc.)

After the image map data and the vector map data are generated for the requesting handheld device, the proxy server 18 sends the image map data 28 and the vector map data 30 to the handheld device 12 over the wired and/or wireless data network 14, 16 to the requesting handheld device 12, as shown at step 114 of FIG. 2. The requesting handheld device 12 may already have resident software installed thereon that is configured to receive, interpret and display a map image from the image map data and vector map data sent by the proxy server 18. If not, appropriate software can be downloaded from the proxy server 18 to the handheld device 12 concurrently with the mapping data. The mapping data may be sent to the handheld device 12 in a variety of known formats, including a Portable Network Graphics (PNG) format or a compressed bit map format.

Figure 5:
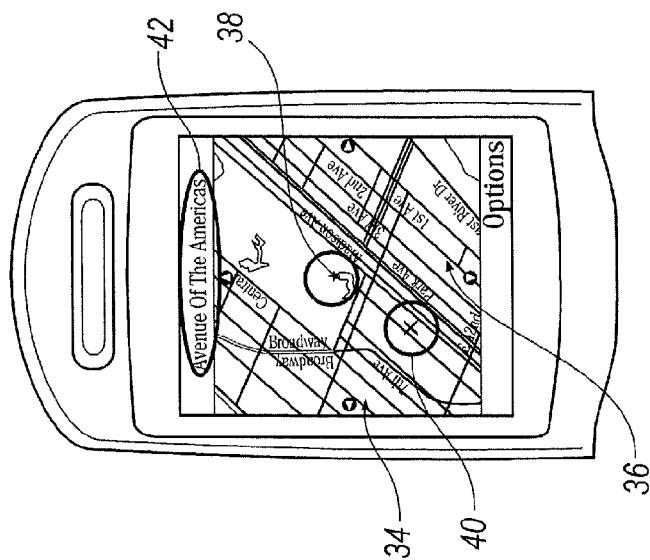
FIG. 5 illustrates a "zoomed out" image on an exemplary handheld device, according to an embodiment.
Figure 4:
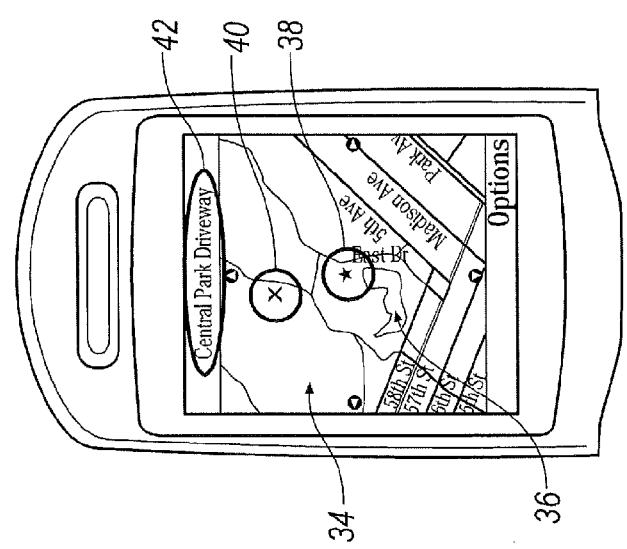
FIG. 4 illustrates a "zoomed in" image on an exemplary handheld device, according to an embodiment.
Figure 3:
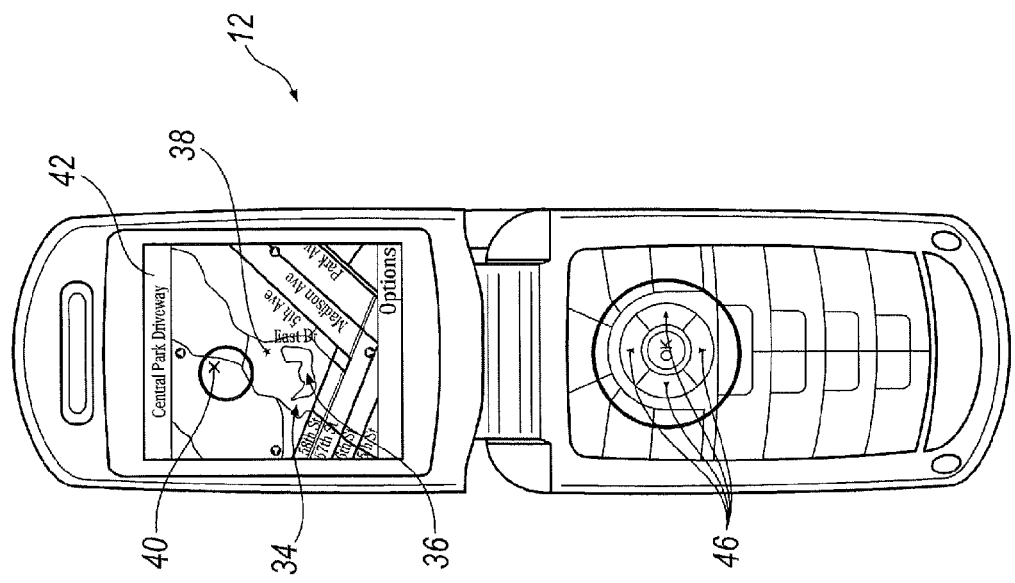
FIG. 3 illustrates an exemplary handheld device configured to display a map image, according to an embodiment.

FIGS. 3-5 illustrate an exemplary handheld device 12, specifically a cellular telephone, which could be used to access the mapping system 10 to request and receive mapping information for a particular geographic location. With particular reference to FIG. 3, the cellular telephone 12 has a display screen 34 that can be used to display, among other things, a static map image 36 derived from the image map data received from the proxy server 18. The map image 36 may include an icon 38, such as a "star" or other marker, which marks the location of the address for which the map data is generated. A cursor 40 and a text box 42 can also be shown on the display screen 34, which together can be used to access and display dynamic information about the static map from the vector map data. Specifically, the user can navigate cursor 40 over the display 34 using various navigation buttons on the handheld device, such as navigation buttons 46 in FIG. 3. As the cursor 40 moves over various locations on the static map image 36, the vector map data corresponding to those locations (e.g., street name, building name, landmark name, etc.) can be displayed in the text box 42. For example, in FIG. 3, the cursor 40 is positioned over the street, "Central Park Driveway." Accordingly, "Central Park Driveway" is displayed in the text box 42, even though it is not shown on the display screen 34 itself. When the cursor is navigated to a different spot on the map image, "Central Park Driveway" will disappear from the text box, and it will be replaced by data from the vector map data set associated with a different location on the map image. The vector map data for the various locations is retrieved and displayed as the user navigates the cursor over the map image according to methods known to those skilled in the art for eliciting desired information from a look-up table. In this way, the mapping system can dynamically display a relatively large collection of information about various locations on the map without cluttering the map image.

The above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalence to which such claims are entitled.

The invention claimed is:

1. A system, comprising:
an image map database configured to store map data for a plurality of geographic areas;
a vector map database configured to store vector map data;
a set of image congestion avoidance heuristics; and
a handheld device in selective communication with said image map database and said vector map database and configured to:
send a mapping request including an indication of a geographic location;
retrieve a set of image map data associated with said geographic location;
retrieve a set of vector map data associated with said geographic location;
dynamically optimize an amount of said set of vector map data to be displayed based on said image congestion avoidance heuristics and a requested zoom level; and
display said set of image map data overlaid by said optimized vector map data.

2. The system of claim 1, wherein said image congestion avoidance heuristics are configured to ensure that said amount of vector map data is appropriate to ensure readability of the display at said requested zoom level.

3. The system of claim 1, wherein said image congestion avoidance heuristics include a heuristic configured to optimize said amount of vector map data such that if too many street names are included at said requested zoom level, only major highways are displayed.

4. The system of claim 1, wherein said image congestion avoidance heuristics include a heuristic configured to optimize said amount of vector map data such that if too little information is available, then all available data may be displayed regardless of zoom level.

5. The system of claim 1, wherein said image congestion avoidance heuristics are customized according to at least one of a particular type and a specification of said handheld device.

6. The system of claim 1, wherein said vector map data includes map coordinates associated with corresponding dynamic display information.

7. The system of claim 1, wherein said indication of a geographic location includes at least one of an address, a name of a resident, a name of a business, and an associated telephone number.

8. The system of claim 1, further comprising a proxy server in selective communication with said image map database and said vector map database, said proxy server configured to receive said mapping request from said handheld device.

9. The system of claim 8, wherein said proxy server is further configured to identify said handheld device making said mapping request.

10. The system of claim 9, wherein at least said set of image map data associated with said geographic location is partially dependent upon said identity of said handheld device.

11. The system of claim 9, further comprising a handheld device database that is accessible to said proxy server, said handheld device database having information relating to display screen capabilities for a plurality of handheld devices.

12. The system of claim 11, wherein said proxy server is further configured to identify said type and specifications of said handheld device making said mapping request based on said handheld device database, and said image congestion avoidance heuristics are partially dependent upon said type and specifications of said handheld device.

13. A method, comprising:
sending a mapping request from a handheld device, the mapping request including an indication of a particular geographic location;
receiving a set of image map data and a corresponding set of vector map data associated with the geographic location; and
applying a set of image congestion avoidance heuristics configured to dynamically optimize an amount of map information displayed on the handheld device based on a requested zoom level.

14. The method of claim 13, further comprising identifying the handheld device sending the mapping request.

15. The method of claim 14, further comprising:
receiving the mapping request by a server; and
generating the set of image map data by the server based in part upon the identity of the handheld device.

16. The method of claim 14, further comprising extracting device information from the mapping request to determine the identity of the handheld device.

17. The method of claim 14, further comprising determining display capabilities of the handheld device according to the identification.

18. The method of claim 17, further comprising accessing the display capabilities from a database correlating various handheld devices to associated display capabilities.

19. The method of claim 17, further comprising customizing the image congestion avoidance heuristics according to the determined display capabilities of the handheld device.

20. A system, comprising:
a display screen;
a processor;
a set of image congestion avoidance heuristics configured to dynamically optimize an amount of map information to be displayed on said display screen based on a requested zoom level; and
instructions tangibly embodied on a computer-readable medium, said instructions configured to cause said processor to:
retrieve a set of image map data associated with a geographic location;
retrieve a set of vector map data associated with said geographic location;
apply said set of image congestion avoidance heuristics to said set of vector map data to dynamically optimize said set of vector map data; and
display said set of image map data overlaid by said optimized vector map data on said display screen.

21. The system of claim 20, further comprising a wireless receiver configured to:
send a mapping request including an indication of said geographic location; and
retrieve said set of image map data and said set of vector map data in the form of wireless signals.

* * * * *